United States Patent [19]

Patrin

[11] Patent Number: 4,712,806
[45] Date of Patent: Dec. 15, 1987

[54] GIROCYCLE

[76] Inventor: Raymond A. Patrin, P.O. Box 306, Queens, N.Y. 11372

[21] Appl. No.: 867,641

[22] Filed: May 28, 1986

[51] Int. Cl.⁴ ............................................. B62M 1/00
[52] U.S. Cl. .................................................. 280/217
[58] Field of Search ................ 280/217, 215; 180/165; 74/572

[56] References Cited

U.S. PATENT DOCUMENTS

| | | | |
|---|---|---|---|
| 1,258,431 | 3/1918 | Myers | 280/217 |
| 1,599,117 | 9/1926 | Conlon | 280/217 |
| 2,141,233 | 12/1938 | Alexander | 280/217 |
| 2,580,944 | 1/1952 | Nemeth | 74/572 |
| 4,116,088 | 9/1978 | Giovachini | 74/572 |
| 4,272,094 | 6/1981 | Patrin | 280/217 |

FOREIGN PATENT DOCUMENTS

| | | | |
|---|---|---|---|
| 118949 | 9/1944 | Australia | 280/217 |
| 2618 | 9/1918 | Netherlands | 280/217 |
| 10945 | of 1896 | United Kingdom | 280/217 |
| 7972 | of 1910 | United Kingdom | 280/217 |

Primary Examiner—John A. Pekar
Attorney, Agent, or Firm—Martin A. Farber

[57] ABSTRACT

A Girocycle VI wheel assembly mounted on a two-wheeled vehicle including a fixed axle, comprises an inner wheel having twin gear hubs rotatably mounted on the axle, a flywheel-gyro adjacent to or between the radially supporting spokes or sides of the inner wheel rotatably supported through a gear assembly on the twin gear hubs, and engageable with the axle through a clutch activated by the joint interaction of an outer wheel clutch controlling a gear and axle mounted thrust wedge, and an outer wheel concentric with the axle and with the inner wheel, and in contact with the ground. A device rotatably locks the two wheels so that they jointly rotate together. Braking causes the outer wheel and consequently the vehicle to stop. The brake at the same time effects disengagement of the inner wheel from the outer wheel and engagement of the flywheel to the axle through a gear thrust wedge and clutch mechanism causing the inner wheel and the flywheel-gyro to rotate relative to and within the outer wheel as long as idling rotation is applied to the inner wheel. The flywheel-gyro is rotatably engaged with the inner wheel and the axle via planetary gears and the clutch mechanism. The inner wheel rotates relative to the axle and rotatably engages the outer wheel remote from the axle and close to the ground. As a result a combined gyroscopic action exerted by the rotating inner wheel and flywheel-gyro assembly operatively connected to the ground through the outer wheel causes the two-wheeled vehicle to remain in upright equilibrium even though the vehicle is stopped. Upon releasing the brake the gyroscopic energy stored during idling will impart to the outer wheel a torsional force and move the vehicle automatically forward before pedaling or other acceleration is applied.

20 Claims, 8 Drawing Figures

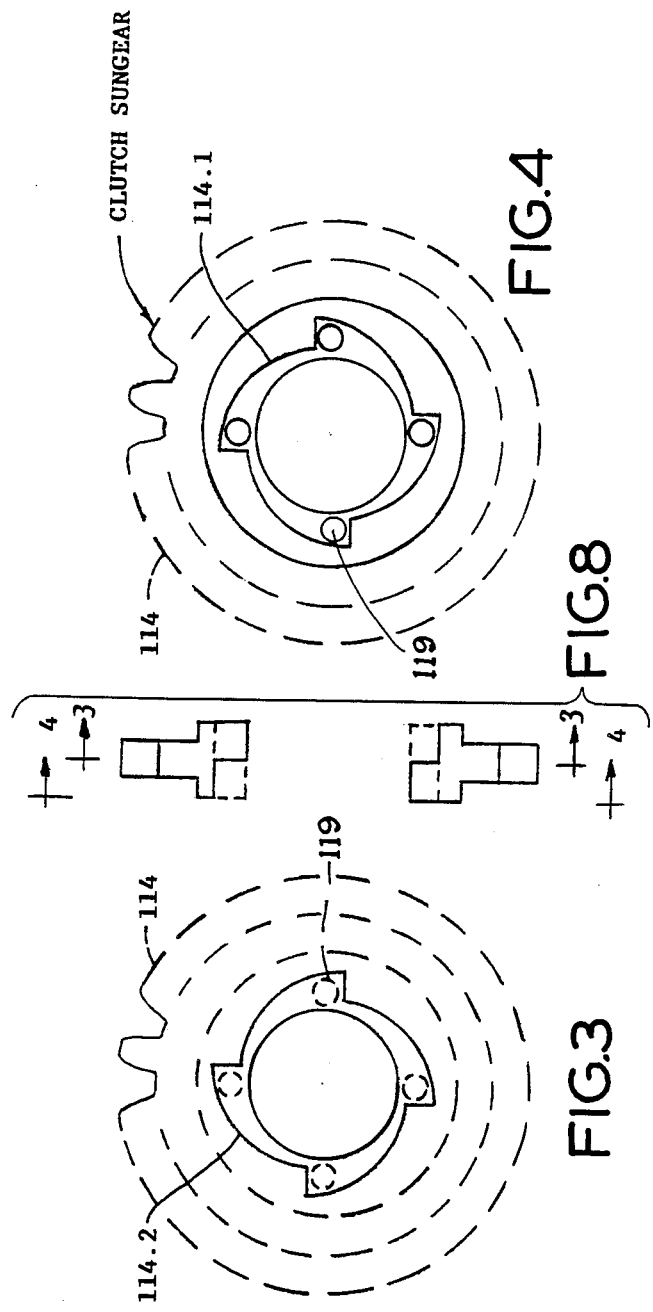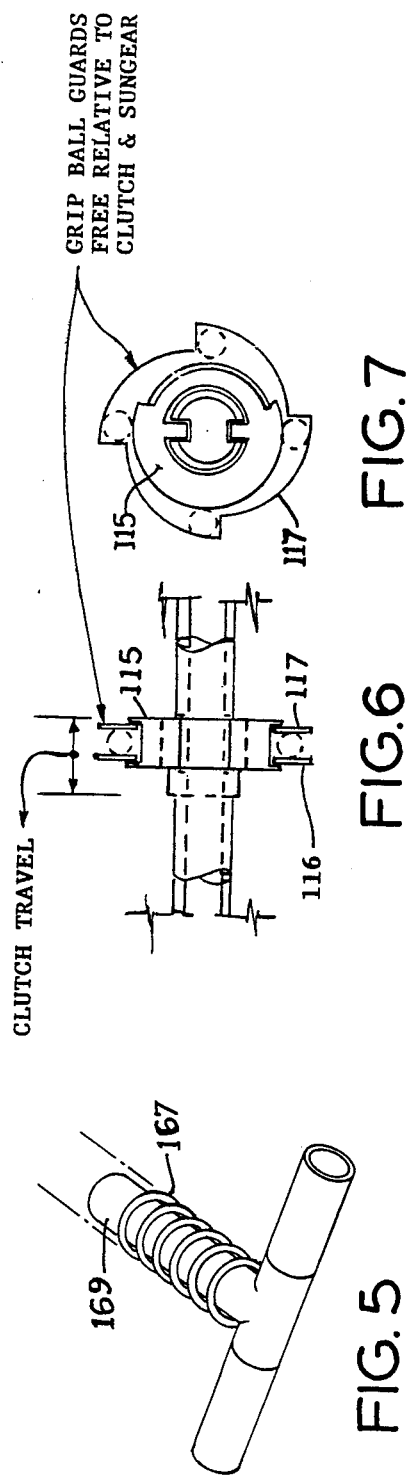

GIROCYCLE

RELATED DOCUMENT

The subject matter of this application has been disclosed in Disclosure Document Ser. No. 129,224 filed July 17, 1984.

FIELD OF THE INVENTION

The invention relates to a wheel assembly particularly for two wheel vehicles such as a bicycle, motorcycle or the like, containing a flywheel-gyro in a double wheel.

BACKGROUND OF THE INVENTION

Many accidents are caused by two-wheeled vehicles, particularly in heavy urban traffic. Due to upright instability of the vehicle when stopped, it is necessary for the user to allow the vehicle to lean from its upright position and step on the ground to stabilize the stopped vehicle. Such departure from the upright position may place the user and his vehicle in the path of traffic, with the possibility of a dangerous collision resulting.

It is an object of the present invention to resolve this safety problem by providing an improved wheel assembly of the introductory-mentioned type which is compact, low in weight, made to readily replace ordinary wheels on existing two-wheeled vehicles, and simplifies engagement and disengagement of the gyro which provides upright stability to the vehicle in a stopped condition. Primary objectives of the wheel assembly are a) safety through the upright equilibrium of a two-wheeled vehicle at its inertial position (i.e. when the vehicle is not in motion), and b) energy conservation and efficiency by restarting the vehicle by energy stored in its inertial position.

SUMMARY OF THE INVENTION

The invention comprises a single tri-wheel assembly constituting the rear wheel assembly of a two-wheeled vehicle which essentially comprises an wheel and an inner wheel with a flywheel-gyro between the spokes or wheel supports, which provides a continued rotation of the inner wheel and the gyro when the outer wheel is stopped, permitting in this condition the two-wheeled vehicle to remain steady in upright equilibrium.

According to one aspect of the present invention, a tri-wheel drive assembly is provided for use on a two-wheeled vehicle having an axle fixedly mounted thereon for providing upright equilibrium of the vehicle when not in motion, the assembly comprising:

(a) an inner wheel mounted on the axle for rotational motion thereabout, the inner wheel being adapted to be driven with rotational forward motion (herein referred to as counterclockwise);

(b) a flywheel-gyro mounted on the inner wheel and driven by the inner wheel in unidirectional rotation, the inner wheel and the flywheel-gyro constituting a binary gyro assembly;

(c) an outer wheel concentric with the inner wheel and freely rotatably mounted thereon at respective operatively engaging surfaces, the outer wheel having an outermost surface for contact with the ground over which the vehicle moves, the distance of the operatively outermost engaging surfaces of the inner wheel from the outermost surface of the outer wheel being substantially smaller than the radius of the operatively engaging surfaces, the radially outermost point of contact of the inner wheel with the outer wheel acting as the connecting point of the inner wheel to the ground through the outer wheel; and (d) dual engaging means, when not actuated (applied) for releaseably engaging the outer wheel with the inner wheel to permit joint rotation of all wheels, and when actuated at braking to stop the vehicle, disengaging (releasing) the inner wheel from the outer wheel and simultaneously increasing the rpm of the flywheel-gyro through a clutch.

According to a further feature of this invention, when the vehicle is stopped and the above-mentioned dual engaging means is actuated (applied), the flywheel-gryo rotates unidirectionally on twin hubs of the inner wheel and more rapidly than the inner wheel by engaging the flywheel-gyro to the stationary axle of the wheels by the clutch, both the inner wheel and the gryo rotating relative to the outer wheel, creating an illusion of riding of the vehicle, although the vehicle is stopped (translationally stationary).

The inner wheel in conjunction with the flywheel gyro acting as a binary gyroscope, the outer surface of which is in contact with the ground through the thickness of the outer wheel, stabilizes the vehicle in the upright position as if it were moving, even though the vehicle is stationary. Therefore it seems as if the vehicle were riding and the same riding stabilizing action of a moving two wheel vehicle is used by the present invention in the translationally stationary condition of the vehicle. The inner wheel and the flywheel gyro constitute the mass of the gyroscope wheel, the inertial mass.

Moreover according to another feature of the invention a conventional braking assembly comprising brake shoes (not shown) is used for stopping the rotation of the outer wheel by being applied against brake rings of the outer wheel. This releases the engaging means thereby causing disengagement of the inner wheel from the outer wheel, and according to still another feature, simultaneously activates a wire spool gear, a thrust wedge and the clutch comprising a reciprocating clutch, causing the engagement of the flywheel with the axle. This permits the inner wheel and the flywheel gyro to rotate freely at varying rates of rotational velocity in conjunction with each other and relative to each other within the outer wheel as long as the braking means remains applied, said outermost point of contact of the inner wheel with the outer wheel acting as the connecting point of the inner wheel to the ground through the outer wheel.

The tri-wheel drive assembly of the present invention may be used on two-wheeled vehicles either as initially installed factory equipment or may be used to replace the ordinary drive wheels on vehicles already in use.

Further the tri-wheel in accordance with the present invention comprises three wheels concentrically rotating one inside the other. The outer wheel comprises a rim having a tire on the rim, the brake rings and assembly thereof, spring-biased wheel engaging wedges, ring stabilizers to counterbalance the spring intensity of the wheel engaging wedges, a rack gear engaging a wire spool gear of the brake rings and a bearing or caster wheel race. The inner wheel comprises a bearing race or wheel casters, a wheel ring rim, radially supporting spokes or wheel supports of a bicycle, motorcycle or other transportation medium, and twin bearing-gear hubs having gear teeth rotatably mounted on a fixed main axle, between spokes or wheel supports, on which planetary gears of the flywheel-gyro engage, consequently supporting the gyro and respective gear mechanism. The flywheel-gyro can be made to operate with a double stage or a single stage gear mechanism (not shown). A double stage gear mechanism will cause the gyro to rotate faster than the single stage gear mechanism, either gear mechanism being constantly engaged with the flywheel-gyro assembly which engages the main axle through the selectively reciprocating clutch in the interior sections of the sungear when the brakes are released. The gyro rotates faster than the inner wheel when the brakes are applied at which time the inner wheel disengages from the outer wheel creating a universal binary gyroscopic effect which results in stabilizing the vehicle in the upright position.

Primary functions of a tri-wheel of the invention are the upright equilibrium of a two-wheeled vehicle when not in forward motion providing rider safety, and the effortless smooth restarting of a vehicle upon releasing the brake using energy stored by the tri-wheel during intervals of gyroscopic inertia as vehicular use requires.

The tri-wheel rotates on two respective surfaces. In forward motion of the vehicle one of these surfaces is the ground on which the outer wheel and the entire vehicle run. While stopped the other surface is the outer race which is mounted on the innermost surface of the outer wheel on which the inner wheel revolves in conjunction with the flywheel-gyro assembly to achieve the desired objective.

BRIEF DESCRIPTION OF THE DRAWINGS

With the above and other objects and advantages in view, the present invention will become more clearly understood in connection with the detailed description of preferred embodiments, when considered with the accompanying drawings, of which:

FIG. 1 is a part side view and part section taken along the lines 1—1, of FIG. 2 showing a rear wheel of a two-wheel vehicle such as a bicycle, motorcycle or the like;

FIGS. 3 and 4 are sections through the sungear along the lines 3—3, 4—4, respectively, of FIG. 8, with the core omitted for clarity of illustration;

FIG. 5 is a perspective view of the T-wedges;

FIG. 6 is an enlarged axial view of the clutch core as shown in FIG. 2;

FIG. 7 is a side view of FIG. 6, and

FIG. 8 is an enlarged axial view of the sungear as shown in FIG. 2.

DESCRIPTION OF THE PREFERRED EMBODIMENTS

Figure 1:
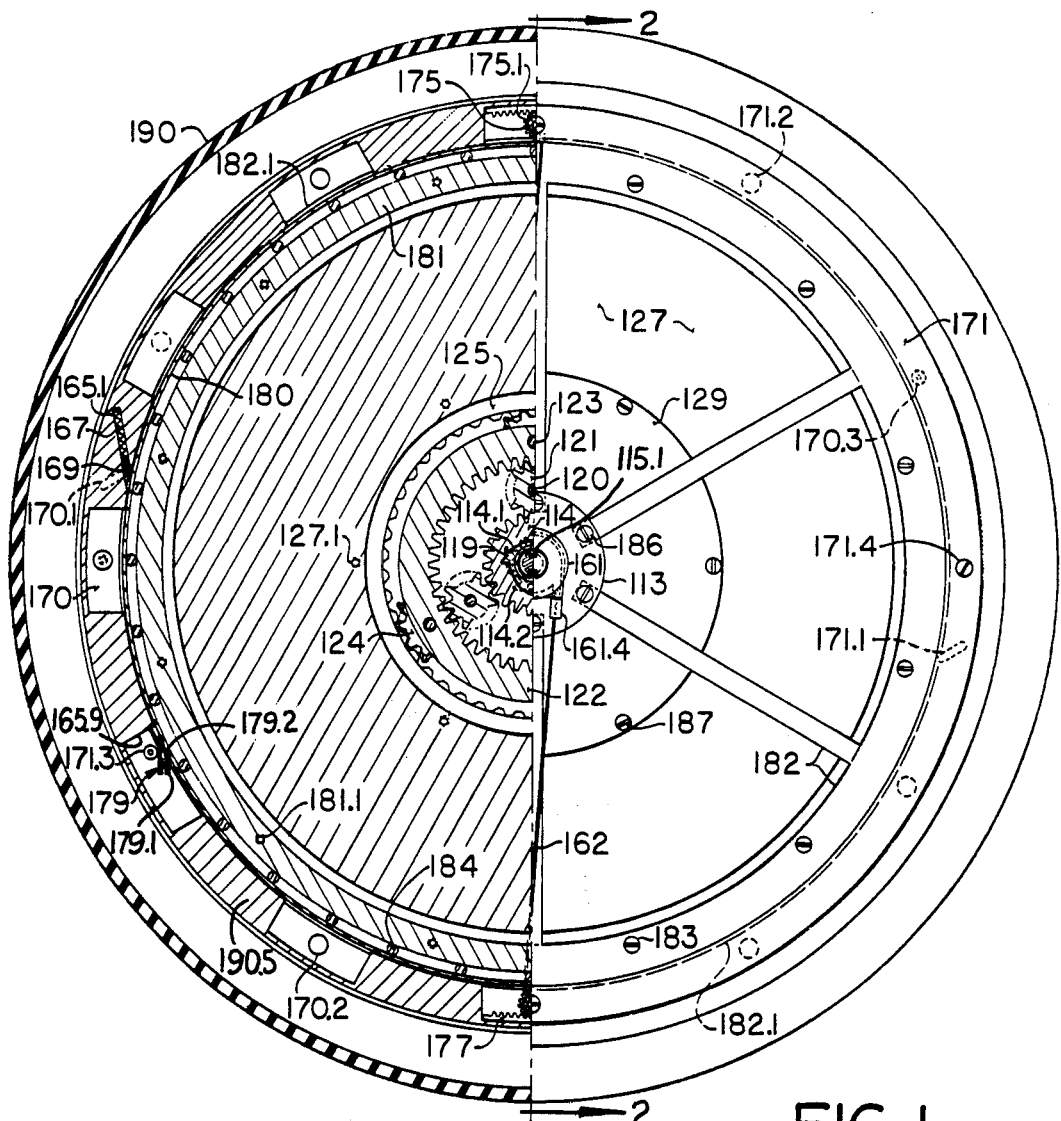
Figure 2:
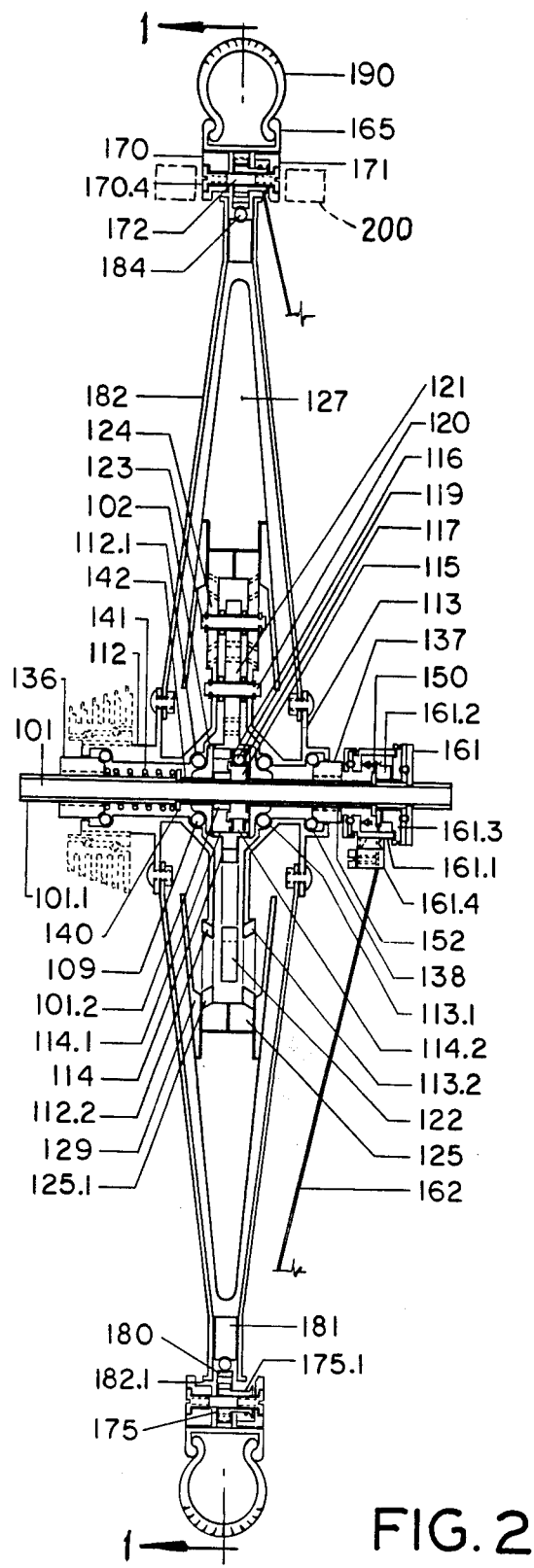
FIG. 2 is a cross-section of the tri-wheel taken along the lines 2—2, of FIG. 1.

Referring now to FIGS. 1 and 2, a tri-wheel in accordance with the present invention (referred to herein as Girocycle VI) is illustrated including an outer wheel having rim 165, brake rings 170, 171, outer race 180 and tire 190, and mounted coaxially therein an inner wheel comprising portions 112, 113, 181, 182 and an annular flywheel gyro 127 concentrically balanced and made of a volume and configuration to suit the particular vehicle application. In the illustrated embodiment example the flywheel-gyro 127 is rotatably mounted, on second stage planetary gears 124 on pivot pins 123, to twin bearing-gear hubs 112, 113, each rotatably mounted on double ball bearings 109, 138 relative to a stationary main axle 101 by means of central races 102 and cones 136, 137. The twin bearing-gear hubs are provided with a plurality of conventional spokes (not shown), or as shown in FIGS. 1 and 2, rims with integral wheel supports 182. Mounted on the axle opposite the drive side of the wheel is a thrust wedge mechanism 161 activated by an outer wheel gear (spool gear) 175 via wire lines 162 which shifts a clutch core 115 to effect the desired flywheel engagement with the main axle.

The hub sections herein called twin bearing-gear hubs 112 and 113 are each formed with an inner plate having a bearing race 112.1 and 113.1 and radially peripheral gear teeth 112.2 and 113.2, bevels or otherwise, supporting flywheel-gyro 127 with covers 129 via the second stage planetary gears, 124 bevels or otherwise, which rotatably extend in pairs therethrough per pivot pin 123 extending through an internal ring gear 122. The ring gear 122 is engaged to and rotated by planetary gears 121 rotatably supported on pivot rods 120 connecting the inner plates of the twin bearing-gear hubs 112 and 113. The hubs are also formed with outer plates having symmetrically spaced holes for securing the radial wheel supports 182 using fastening devices 186.

A conventional free-wheel drive chain gear or sprocket shown in dashed lines at the left side of FIG. 2 (not being a part of this invention) operatively drivingly engages the hub 112, which hub constitutes means for imparting rotational forward motion to the inner wheel rim and radial supports 182, annular ring race 181 and the other hub 113 rotatably mounted on the axle 101 by means of the inner hub races 112.1, 113.1 and central races 102 via bearing balls 109 and outer conventional races via bearing balls 138 by means of cones 136, 137 securely threaded to the stationary main axle. When the drive chain sprocket is actuated the twin hubs 112, 113 and the wheel assembly are rotated on the fixed main axle 101 via the bearing balls 109 and 138.

The inner wheel ring race 181 is centrally coaxially disposed relative to the main axle 101 and is connected to the inner wheel rims formed with radial supports 182. The rims separated by the gauge thickness of the ring race 181 are formed with suitably shaped peripheral flanges 182.1. The rims and supports have holes through which fastening devices 186, 183 project and are fastened respectively in holes 181.1 on both sides of the ring race 181 and in uniformly spaced holes on the peripheral outer plates of the twin bearing-gear hubs 112, 113 to hold the inner wheel ring race 181, the rims and the supports 182 in place.

The flywheel-gyro 127 has a cross-sectional shape which radially narrows up to its outer periphery and is centered between the ring race 181, rims and integral wheel supports 182. The sides of the flywheel-gyro are tapered parallel and substantially complementary to the rate of incidence of the supports 182. The inner periphery of the gyro mass forms an inner diameter cylindrical surface having an internal gear 125 bevel or otherwise, firmly keyed-in to form a solid single-piece unit with the flywheel-gyro 127, defining therein a space within which a driving and gearing mechanism, including a clutch means, is assembled for selectively operatively engaging the flywheel-gyro 127. The flywheel-gyro covers 129 are secured by fastening devices 187 threaded to holes 127.1 on both sides of the flywheel-gyro. Each cover 129 is split into two rainbow-shaped sections for convenience of installation and maintenance, forming a single annular disc unit hollow at the center and radially spaced from each hub cylinder when set in place and in mutual balance complementary to the flywheel-gyro structure.

The main axle 101 is formed with two rainbow-shaped (substantially semi-cylindrical) longitudinal projections 101.2 formed in one-piece integral with the axle and located at the center of the axle, which are formed with channel recesses 101.1 spaced 180 degrees apart separating the projections 101.2. Clutch core 115 has a bore with diametric radially inwardly projecting integral clutch guides 115.1 (See FIG. 1) which are axially displaceably disposed in the channel recesses 101.1 between the projections 101.2. In this way the clutch core 115 is rotatably immoveable yet axially slidable between the projections 101.2. Recess sliding bars 142 and 152 longitudinally slidably mounted on the axle 101 abut clutch guides of clutch core 115 receiving pressure via internal guide washers 150, 140 by thrust wedge 161.2 and/or spring 141 respectively. Grip-balls 119 are mounted on the clutch core by free guards 116, 117.

The clutch mechanism comprises a portion of a sungear 114 axially immoveable yet selectively rotatably free having outer peripheral teeth engaging the planetary gears 121, which forms a double hub extending on both axial sides at the peripheral base of the gear teeth with a bore with two internal sets, one on each axial half, of mirror-symetrically reversed wedge-type slots 114.1, 114.2. The grip-balls 119 respectively engage therein via the clutch core 115, depending on whether the vehicle is in its condition of motion or stopped respectively. The grip-balls 119 are situated on the external peripheral surface of the clutch core 115 between the two free guards 116, 117. These guards 116, 117 respectively are formed complementary to the respective inner periphery on the left and right axial halves of the bore of the sungear 114, the bore defining the reversed wedge-type slots 114.1, 114.2 respectively. The balls 119 freely orbit on the clutch core 115 or are engageably stopped relative to the clutch core depending on the axial position of the clutch core 115. Flanges formed on the outer peripheral sides of the clutch core 115 contain the free guards 116, 117 positioning the grip-balls 119.

The grip-balls are positionable in either of the reversed wedge-type slots 114.1 or 114.2 (FIGS. 3 and 4), which are axially aligned adjacent to each other, and radially overlap so by sliding the clutch core 115 from one axial side to the other, the grip-balls 119 pass through, disengaging from the slots on one axial side and engaging the slots in the other axial side, thus engaging the sungear 114 to the desired rotational direction relative to the rotational direction of the wheel assembly.

Two central bearing races 102 formed with a bore snugly fit around the main axle 101 and abut against each side of the longitudinal projections 101.2 confining therebetween the reciprocating movement of the clutch core 115. The freely rotatably disposed sungear 114 is internally constantly engaged with the clutch core 115 via the grip-balls 119 and is externally engageable through its peripheral teeth 125.1 to the planetary gears 121. Between the twin bearing-gear hubs 112, 113, the pivot rods 120 rotatably hold the planetary gears 121 which link the clutch sungear 114 to the internal ring gear 122 through which pivot rods 123 rotatably link the second stage planetary gears 124 in pairs between the peripheral gear teeth 112.2, 113.2 of the hubs of the inner wheel and the flywheel-gyro's internal gear teeth 125.1 on both sides, rotatably jointly maintaining alignment of the flywheel-gyro 127 in a central vertical axis defined by section line 1—1 as shown on FIG. 2.

The thrust wedge mechanism 161 comprises two thrust races and a cylindrical housing 161.1 rotatably attached therebetween via bearing balls as shown on FIG. 2. The race on the left abuts cone 137 remaining still. The race on the right is keyed to the axle 101, pressed by an axle bolt through the frame of the vehicle (not shown), also stationary with the main axle. Between the thrust races against the bearing balls, the cylindrical housing 161.1 is axially immoveable but rotatably free and is formed with housing thrust wedges 161.3 and with a pair of tangential accesses for each wire line 162 having a cushion shield 161.4. The wire lines 162 continue partially wound around inner thrust wedges 161.2 which are complementary to the housing thrust wedges 161.3 but relative thereto are free to rotate and as a result to axially displace internal guide washer 150 and sliding bars 152 in the direction of the arrows pointing to the left of FIG. 2 when the wire lines 162 are unwound from the wedges 161.2, forcing clutch core 115 to shift from the sungear wedge slot 114.2 to slot 114.1 as it compresses coiled spring 141 via the sliding bars 142 and the internal guide washer 140.

Releasing the wire lines 162 by releasing the brake shoes (not shown) expands the spring 141 displacing the internal guide washer 140 and the slide bars 142 to the right forcing the clutch core 115 to return to the sungear wedge slots 114.2 as the sliding bars 152 via the internal guide washer 150 axially press on the thrust wedges 161.2 in the opposite direction of the arrows to the right back to their original position. This causes the thrust wedges to rotate by contact with the inclined wedge surfaces of the stationary wedge 161.1 so as to rewind the wire lines 162 on the wedges 161.2.

During joint (1 to 1 ratio) rotation of the inner wheel with its parts 112, 113, 181, 182, the flywheel-gyro 127 with its auxiliary gearing and the outer wheel 165, there is no relative movement between the inner race of bearing 181 and the outer race of bearing 180. This outer race is attached to the outer wheel 165. The sliding means may be bearing balls 184 as illustrated by example only, or casters attached to the peripheral rims 182 (not shown) or other means.

The brake rings 170, 171 are mounted on the outer wheel with limited angular displacement relative the outer wheel by means of fastening devices 170.4, 172 and a synchronizing spool gear 175 rotatably mounted thereon and fastening devices 171.4. The fastening devices are not rigidly connected to the outer wheel. A tubeless or tubed tire 190 is illustrated at the outermost position of the outer wheel on the outer wheel rim structure 165, the latter having inwardly projecting integral peripheral extensions (unnumbered) along which spaces are uniformly circumferentially formed. Designated spaces which are circumferentially separated are formed with rack gear teeth 177 on the outer wheel which mesh with the spool gear 175 which is rotatably mounted on axle 172 via the fastening devices 170.4, and together with fastening devices 171.4 promote movement in unison of both of the brake rings particularly when they are braked in a clockwise relative motion, opposite to the direction of the counterclockwise and forward rotation of the outer wheel, referring to FIG. 1, when conventional brake shoes 200 are applied against both brake rings 170, 171, effecting the winding of wire line 162 onto the gear spool 175.1. The angular shifting of the brake rings 170, 171 via their slots 170.1, 171.1 simultaneously pulls back and releases wheel wedges 169 which then disengage the inner and outer wheels.

The wheel wedges 169 are each T-shaped with its long leg centrally mounted displaceably in vectorial wedge travel slots 165.1 cut into inwardly projecting peripheral extensions of the wheel rim 165. The cross bar arm edges of the T-wedges engage in similar angular slots 170.1, 171.1 in the brake rings 170, 171. The long leg of the T-wedges 169 are encircled and slidably biased by a compression spring 167 disposed in the slots 165.1. The slots 165.1 are angled in intersecting direction with the outer periphery of the inner wheel so that the wedges 169 provide wedging engagement against the outer surface of the inner wheel rim flanges 182.1. The aforementioned elements 165.1, 167, 169, 170.1 and 171.1 constitute engaging means for releasably engaging the inner and outer wheels.

The outer wheel rim structure 165 is formed with the wedge slots 165.1. One compression spring 167 and one T-wedge 169 are provided in each slot 165.1. The long leg (base) of the T-wedge 169 projects into the free end of the coiled spring 167 as the arms of the T-wedges project axially and movably displaceably into the brake ring slots 170.1 and 171.1. The slots 165.1 with the springs 167 and the wedges 169 are located equidistantly on the wheel perimeter as required. In FIG. 1 the compression springs 167 press on the wedges 169 counterclockwise which is also the normal direction of the wheel rotation for forward motion. The wedges 169 (see FIG. 5) have a T-cross section shape, and the arms wedgingly engage against the outer peripheral surfaces of both of the inner wheel rim flanges 182.1 and the outer wheel so as to be suitable to engage the outer and inner wheels and respectively to disengage the inner wheel from the outer wheel when the brake is applied against the brake rings 170, 171 as controlled by the rider of the vehicle via the conventional brakes 200. The disengagement occurs when the brakes are actuated exerting simultaneous pressure on both of the brake rings 170, 171 on the left and right sides of the outer wheel respectively, sliding the brake ring slots 170.1, 171.1 clockwise and causing the wedges 169 to move further into the slots 165.1 away from the peripheral outer surfaces of the inner wheel rim flanges 182.1, as the springs 167 resist brake pressure on the brake rings.

The brake rings are formed with two types of spacers 170.2, 171.2 and 170.3, 171.3 which project toward each other. Both types of spacers retain the brake rings 170, 171 at a predetermined distance between each other for freedom of braking movement by preventing buckling resulting from brake pressure. Spacers 170.3, 171.3 also serve as means of abutment with stabilizer 179. The stabilizer comprises a stationary plate 179.1, at one end of which an expansion spring 179.2 exerts pressure on a hinged plate of the stabilizer 179, which hinged plate applies pressure on the brake rings 170, 171 via the brake ring spacers 170.3, 171.3 opposing pressure applied by the spring 167 via the wedges 169 in the brake ring slots 170.1, 171.1. The stationary plate 179.1 is mounted on the outer surface of the outer wheel race 180 in spaces between inwardly projecting peripheral extensions 190.5. The stabilizer 179 is an auxiliary device used to neutralize pressures opposing the clockwise sliding of the brake rings 170, 171.

The arrangement herein, illustrated by example only, shows that by means of the T-wedges 169 the outer wheel rim structure 165 is jointly rotatably connected to the inner wheel 112, 113, 181, 182 through the annular race 180 on which the bearing balls 184 (casters, rollers, or like rotating elements) now do not turn, with the spool gear 175 kept in its neutral position. When the brake is applied as above discussed, the casters or bearings rotate during rotation of the inner wheel 112, 113, 181, 182 relative to the outer wheel rim structure 165 as the spool gear 175 engagedly travels a short braking distance with the brake rings 170, 171 winding wire line 162 on spool 175.1, thus actuating the clutch wedges 161.2 to operatively engage the flywheel-gyro 127 to the main axle 101 via the clutch core 115 in order to perform its gyroscopic function.

By eliminating the second stage planetary gear 124 and connecting the internal ring gear 122 to the flywheel center via the planetary gears 121, the gyro can then rotate on the single stage set of planetary gears 121 alone, faster than the inner wheel but slower than with the present illustrated second stage planetary gear arrangement.

The outer wheel and the inwardly projecting peripheral extensions in the drawing are all integrally formed in one piece.

SEQUENCE OF OPERATION

During normal driving operation the brakes are released and the wedges 169 are pressed by the spring 167 toward the radially innermost end of the outer wheel slots 165.1 engaging the outer wheel and the inner wheel rims 182 adjacent the cylindrical inner wheel ring race 181 between the flanges 182.1 causing both the inner and outer wheels in this manner to lock together. These wheels then rotate when torsional force is applied rotatably driving the hubs 112, 113.

To stop the outer wheel rim structure 165 the vehicle brakes are applied. Brake shoe pressure increases friction proportionately, causing the brake rings 170, 171 to roll, via spool gear 175 on the gear rack 177, in the clockwise direction, relatively counter to the forward moving direction of rotation of the outer wheel rim structure 165, pulling back with them the T-wedges 169 further into the slots 165.1. When brake ring spacers 171.3 abut the axial side 165.9 of inwardly projecting peripheral extensions of the outer wheel 165 causing braking and the slowing down or stopping of the outer wheel 165, 190, the pulled back wedges 169 which disengage the inner wheel rim flanges 182.1 from the outer wheel rim structure 165 leave the inner wheel 112, 113, 181, 182 free to rotate with the brakes engaged. Resistance, by the T-wedge spring 167 by the ends of the arms of the T-wedges 169 engaging in slots 170.1 in the brake rings and by the spool gear 175, exerted upon the brake rings 170, 171 at the time of braking is neutralized by the brake ring stabilizer 179, the spring 179.2 of which presses in the clockwise direction of the brake rings 170, 171 to assure a spontaneous counter-balanced response on the brake rings and an effortless disengagement of the T-wedges and the thrust wedges 161.2 in the predetermined clockwise roll of the brake rings.

That is when the driver applies the brakes and the brake rings 170, 171 which simultaneously pull back the T-wedges 169, the spool gear 175 rolls and its gear spool 175.1 pulls wire lines 162 outwardly by winding on it the wire lines 162, unwinding from and causing the inner thrust wedges 161.2 to rotate and thereby displace axially to the left in FIG. 2 pressing on internal guide washer 150 and sliding bars 152 in the direction of the arrows in FIG. 2. As a consequence, the spring 141 is pressed via the internal guide washer 140 and the sliding bars 142, placing the clutch core 115 along with the grip-balls 119 in the sungear wedge slots 114.1. This locks the sungear 114 to the stationary axle 101 against a counterclockwise rotation.

Under idling pedaling or idling motor power, the inside of the outer wheel 165, 170, 171, 180, 190, the hubs and the inner wheel 112, 113, 181, 182 rotate exerting counterclockwise pressure on the now stationary sungear 114 through the planetary gear 121 which is forced to rotatably orbit on the pivot rods 120 around the stationary sungear 114 exerting a first stage accelerated RPM on the internal ring gear 122, rotating faster than the idling inner wheel 112, 113, 181, 182.

The pairs of planetary gears 124, rotatably supported through pivot rods 123 on the internal ring gear 122, engage the gear teeth 112.2, 113.2 of the wheel hubs 112, 113 providing a second stage accelerated speed to the flywheel-gyro 127 through its gear teeth 125.1. This speed is faster than the first stage RPM of the internal ring gear 122 and substantially faster than the idling RPM of the inner wheel 112, 113, 181, 182.

Important aspects of this invention are the braking and transfer to the outer wheel the action of the inner wheel 112, 113, 181, 182 and the flywheel-gyro 127, ultimately returning forward power to the vehicle when the brakes are released. In the forward counterclockwise riding condition, the thrust wedge housing 161.1, the inner thrust wedges 161.2, the housing thrust wedges 161.3, the wire line shields 161.4 and the wire lines 162 are controlled by the outer wheel rim structure 165. Actuating the brakes rolls the brake rings 170, 171 clockwiseback which disengages the T-wedges 169 from the inner wheel flanges 182.1 and which relatively wind the wire lines 162 on the gear spool 175.1. The outer wheel 165, 190 slows down and stops, and with it, the thrust wedges 161.1 to 161.4. The wire lines 162 stop, and simultaneously the clutch core 115, via grip balls 119 guided between the free guards 116, 117, engage the sungear wedge-type slots 114.1. The inner wheel is free to rotate and the gyro is thus free to rotate at accelerated rpm relative to that of the inner wheel based on gear ratios, thus creating a binary gyroscopic effect, both as a result of the distance of the proximity to the ground of the operatively engaging surfaces of the inner wheel's sliding means 180 and the stabilizing gyroscopic effect of the flywheel-gyro 127 maintaining the upright position of the vehicle as the rider continues to pedal with low pedal energy or via motor power, as the brakes remain engaged. Self-locking brake handles can be provided for keeping the brakes engaged.

To move forward again the driver releases the brakes and the T-wedges 169 are pressed counterclockwise with the brake rings 170, 171 by the spring 167, in FIG. 1, so as to engage the inner and outer wheels to jointly turn. Simultaneously the gear spool 175.1 releases the wire lines 162 setting back (shifting toward the right) windingly the inner thrust wedges 161.2 and simultaneously moving the sliding clutch core 115 via the balls 119 to the right into engagement with the wedge-type slots 114.2. This locks the sungear 114 to the main axle 101, this time against a clockwise rotation. Since the speed of the flywheel-gyro 127 exceeds that of the just starting joint inner and outer wheel assembly occurring at the release of the brakes, the gyroscopic energy stored in the form of revolutions during idling, now will impart to the inner and outer wheel a torsional force capable of moving the vehicle forward simultaneously before pedaling or other acceleration takes place.

While I have disclosed embodiments of the invention, it is to be understood that these embodiments are given by example only and not in a limiting sense.

I claim:

1. A wheel assembly for a vehicle having an axle fixedly mounted thereon, comprising
    an inner wheel rotatably mountable on the axle, said inner wheel having a surface, said inner wheel adapted to be imparted a rotational forward motion,
    an outer wheel mounted centrally and concentric, peripherally around said inner wheel and rotatably relative thereto,
    said outer wheel having an outermost surface adapted for riding contact with the ground and having an inner surface operatively engaging said surface of said inner wheel, said inner surface and said surface of said inner wheel constituting operatively engaging surfaces,
    the distance of said operatively engaging surfaces from said outermost surface is substantially smaller than the radius of said operatively engaging surfaces, whereby said inner wheel makes substantially relatively close contact with the ground through said outer wheel,
    a flywheel-gyro mounted centrally and concentric to and rotatable by said inner wheel and rapidly rotatably relative thereto,
    engaging means for selectably releasably engaging said outer wheel and said inner wheel and said flywheel-gyro for joint rotation.

2. The wheel assembly according to claim 1, wherein said distance of said operatively engaging surfaces is measured from a radially outermost operative point of contact of the inner wheel with the outer wheel, said point of contact constitutes said inner surface of said outer wheel.

3. The wheel assembly according to claim 1, further comprising
    rolling means disposed on and between said inner surface of said outer wheel and said surface of said inner wheel for permitting said inner wheel to rotate relatively to said outer wheel when said engaging means is released.

4. The wheel assembly according to claim 3, wherein said rolling means constitutes a plurality of rotatable elements.

5. The wheel assembly according to claim 1, further comprising
    braking assembly means, when applied, for stopping rotation of said outer wheel and for simultaneously releasing said engaging means causing disengagement of said inner wheel from said outer wheel and from joint rotation with said flywheel-gyro.

6. The wheel assembly according to claim 5, wherein said braking assembly means comprises brake rings displaceably disposed on lateral sides of the outer wheel, operatively connected to said engaging means and adapted to be braked by vehicle brakes, the braking by the vehicle brakes effecting the application of said braking assembly means,
    said brake rings constitute means cooperative with said outer wheel during actuation of the vehicle brakes for braking said outer wheel in a braking position of said brake rings relative to said outer wheel displaced relative to an unbraked position of said brake rings relative to said outer wheel, and for retaining said braking position as long as the vehicle brakes remain actuated, keeping said engaging means released.

7. The wheel assembly according to claim 6, wherein said engaging means is operatively connected to said brake rings for releasing when said brake rings are displaced into said braking position.

8. The wheel assembly according to claim 7, wherein said engaging means comprises,
slots formed in said outer wheel adjacent said surface of said inner wheel and in said brake rings and slanted at oppositely directed acute angles respectively with respect to a tangent to said surface of said inner wheel,
a plurality of wedges each displaceably mounted both in one of said slots in said outer wheel and in adjacent of said slots in said brake rings, and
spring means mounted in said slots in said outer wheel for pressing said wedges into wedging engagement with said inner wheel.

9. The wheel assembly according to claim 7, wherein said engaging means comprises,
slots formed in said outer wheel adjacent said inner wheel,
wedges displaceably mounted in said slots,
spring means mounted in said slots for pressing said wedges into wedging engagement with said inner wheel,
said wedges have an abrasive portion in said wedging engagement with said inner wheel,
said wedges are operatively mounted in said brake rings and by the latter are pulled away from said inner wheel in the displaced said braking position of said brake rings relative to said outer wheel.

10. The wheel assembly according to claim 9, wherein
said wedges have a T-shape with a leg displaceable mounted in said slot, and with arms,
said brake rings are formed with brake ring slots, and
end tips of said arms displaceably extend into said brake ring slots.

11. The wheel assembly according to claim 7, wherein
said engaging means comprises,
a spool rotatably mounted on said brake rings,
gear means, when activated, for rapidly rotating said flywheel-gyro relative to and by said inner wheel,
clutch means for activating said gear means,
a wire windable on said spool and operatively connected to said clutch means, and
said outer wheel includes means for rotating said spool when said brake rings are displaced into said braking position.

12. The wheel assembly according to claim 11, wherein
said spool is a spool gear,
said means for rotating said spool comprises a rack meshing with said spool gear.

13. The wheel assembly according to claim 11, wherein said gear means when unactivated for jointly rotating said flywheel-gyro to and by said inner wheel in 1:1 rpm ratio.

14. The wheel assembly according to claim 13, wherein
said gear means includes,
a sungear rotatably mounted on said axle,
planetary gears mounted on said inner wheel and meshing with said sungear and operatively meshing with said flywheel-gyro,
said clutch means includes a clutch core non-rotatably fixed to said axle,
said clutch means when the vehicle brakes are not applied for engaging said clutch core with said sungear so as to prevent said sungear from rotating in a rotatable direction reverse to said rotational forward motion but so as to permit said sungear to be freely rotatably in a rotatable direction of said rotational forward motion, and vice versa when the vehicle brakes are applied.

15. The wheel assembly according to claim 14, wherein
said clutch means includes a thrust wedge means windable with said wire and mounted rotatably and displaceably on said axle for engaging said clutch core with said sungear.

16. The wheel assembly according to claim 15, wherein
said thrust wedge means includes a rotatably and displaceable half and a relatively stationary half,
said halves are formed with saw-tooth like complementary surfaces inclined relative to the axle, and
spring means mounted on said axle for operatively biasing said rotatably and displaceable half against said relatively stationary half.

17. The wheel assembly according to claim 14, wherein
said clutch core is displaceable on said axle,
said sungear is formed with axial halves thereof respectively with mirror-symmetrically reversed wedge slots respectively engageable by said clutch core.

18. The wheel assembly according to claim 17, wherein
said clutch core includes balls mounted thereon engaging in alternately of said mirror-symmetrically reversed wedge slots.

19. The wheel assembly according to claim 14, wherein
said gear means further includes,
an internal ring gear meshing with said planetary gears,
second stage planetary gears mounted on said internal ring gear and meshing with said inner wheel and said flywheel-gyro.

20. The wheel assembly according to claim 19, wherein
said inner wheel comprises twin hubs having inner plates, said sungear and said first-mentioned planetary gears are mounted between said inner plates, the latter being formed with peripheral gear teeth meshing with said second stage planetary gears, said flywheel-gyro being formed with internal gear teeth meshing with second stage planetary gears.

* * * * *